L. W. BAILEY.
NUT LOCK.
APPLICATION FILED MAY 2, 1914.

1,166,736.

Patented Jan. 4, 1916.

Witnesses
W. H. Mulligan
W. E. Valk Jr.

Inventor
Layman W. Bailey

By Richard Bowen,
his Attorney

UNITED STATES PATENT OFFICE.

LAYMAN W. BAILEY, OF WARRENSBURG, MISSOURI.

NUT-LOCK.

1,166,736.

Specification of Letters Patent. Patented Jan. 4, 1916.

Application filed May 2, 1914. Serial No. 836,021.

*To all whom it may concern:*

Be it known that I, LAYMAN W. BAILEY, citizen of the United States, residing at Warrensburg, in the county of Johnson and State of Missouri, have invented certain new and useful Improvements in Nut-Locks, of which the following is a specification.

My invention relates to an improved nut lock wherein a spirally coiled washer, smooth on one face and provided with an abutment tooth on the other, is interposed between the element bolted and the nut, the inner face of the latter being serrated to abut said tooth, and in this manner lock itself against a reverse turning upon the bolt.

The invention further contemplates a structure wherein means is provided to lock the washer against rotary movement upon the bolt, thereby causing, as the nut is forced home, a flattening of the washer against the element bolted and a pressure to be exerted upon the nut at all times, said means being such in its nature as to bite into the bolt upon a forced turning of the nut.

In describing my invention in detail reference will be had to the accompanying drawings wherein like characters denote like or corresponding parts throughout the several views, and in which:—

Figure 1:
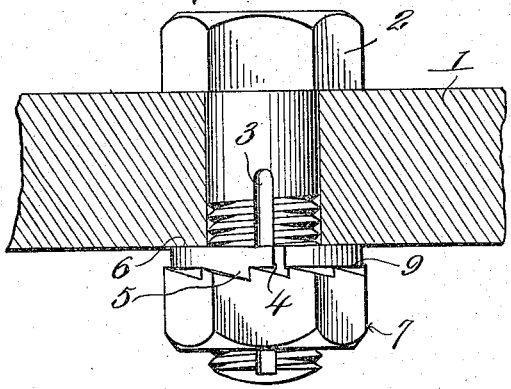
Figure 2:
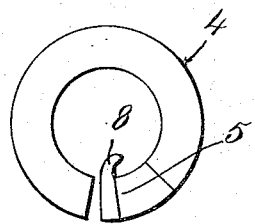
Figure 3:
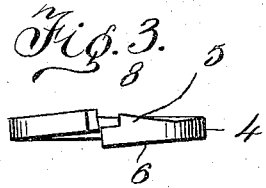
Figure 4:
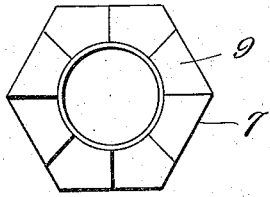
Figure 5:
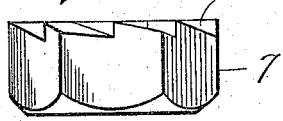
Figure 6:
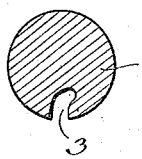

Figure 1 is a side elevation of a nut lock device constructed in accordance with the present invention, the element bolted being shown in section; Fig. 2 is an outer face view of the washer; Fig. 3 is an edge view; Fig. 4 is an inner face view of the nut; and Fig. 5 is an edge view thereof. Fig. 6 is a cross section of the bolt.

Referring now to the drawings by numerals, 1 designates the element bolted, 2 the bolt and 3 a groove extending longitudinally of the threaded portion thereof. A spiral washer 4, formed with a tooth on one face as indicated at 5 and smooth on the other as indicated at 6, is adapted to be interposed between the nut designated as an entirety by the numeral 7 and the said element 1, the smooth face 6 being in engagement with the latter. A curved, sharp lip or locking lug 8 is integral with the washer 4, said lug fitting the groove 3 (correspondingly formed) to prevent rotary movement of the washer upon the bolt, the peculiar formation of the lip and the correspondingly peculiarly formed groove providing for a biting engagement of the said lip with the bolt upon a forced turning of the nut. The inner face of the nut 7 is serrated as indicated at 9, the said face being adapted for engagement with the outer face 5 of the washer upon the application of the nut upon the bolt.

When it is desired that the nut 7 be locked against reverse turning, the washer 4 is first arranged over the threaded portion of the bolt, the locking lug 8 fitting the groove 3 and the smooth face 6 of the washer engaging the element to be bolted. The nut 7 is then forced home, causing the said spiral washer to be flattened against the element and causing the serrations 9 of the nut to engage the tooth 5 of the washer in a manner necessary to an effectual locking of the nut.

From the foregoing, taken in connection with the accompanying drawings it is apparent that by the spiral formation of the washer 4, the nut, when forced home, will flatten the washer and cause the latter to at all times exert an outward pressure upon the nut to maintain the abutting teeth of the washer and nut in clutch like engagement; that movement of the washer cannot be effected by reason of the engagement of the lug 8 with the walls of the groove; and that if desired, a tool of any suitable type may be forced between the extremities of the washer 4 (said washer being of course split) to in this manner spread the same and provide for the removal or reverse turning of the nut.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a nut lock, a bolt having a longitudinal inwardly curved groove, one of the walls of which is concaved and the other convexed, a locking member fitting upon the bolt, a lug integral with the locking member, the lug being shaped to fit the curved groove, the biting edge formed by the lug formation being adapted for engagement with the wall of the groove, and a nut adapted for engagement with the locking member, the formation of the groove and lug adapted to cause the latter, upon a reverse rotation of the nut, to lodge itself deeper into the groove, as and for the purpose set forth.

2. In a nut lock, a bolt having a longitudinal laterally curved groove formed therein, one wall of the groove being concaved and the other convexed, a locking member, a lug integral with the locking member, the lug being shaped to fit the curved groove, a nut, and means on the nut to engage the locking member for the purpose specified.

In testimony whereof I affix my signature in presence of two witnesses.

LAYMAN W. BAILEY.

Witnesses:
J. R. ROTHWELL,
GOLDIE M. MAXWELL.

Copies of this patent may be obtained for five cents each, by addressing the "Commissioner of Patents, Washington, D. C."